(12) United States Patent
Fryer et al.

(10) Patent No.: US 10,771,831 B2
(45) Date of Patent: Sep. 8, 2020

(54) SYSTEM AND METHOD FOR PREEMPTIVE ADVERTISEMENT CACHING TO OPTIMIZE NETWORK TRAFFIC

(71) Applicant: AT&T Intellectual Property I, L.P., Atlanta, GA (US)

(72) Inventors: Todd Andrew Fryer, Liberty, MO (US); Nicholas Nicas, Blue Springs, MO (US); David Irvin, Lawrence, KS (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

(21) Appl. No.: 15/841,494

(22) Filed: Dec. 14, 2017

(65) Prior Publication Data
US 2019/0191204 A1    Jun. 20, 2019

(51) Int. Cl.
| | |
|---|---|
| H04N 7/10 | (2006.01) |
| H04N 21/262 | (2011.01) |
| H04N 21/432 | (2011.01) |
| H04N 21/433 | (2011.01) |
| H04N 21/25 | (2011.01) |
| H04N 21/24 | (2011.01) |
| H04N 21/458 | (2011.01) |
| H04N 21/6405 | (2011.01) |

(Continued)

(52) U.S. Cl.
CPC ... *H04N 21/26241* (2013.01); *H04N 21/2402* (2013.01); *H04N 21/251* (2013.01); *H04N 21/4325* (2013.01); *H04N 21/4331* (2013.01); *H04N 21/458* (2013.01); *H04N 21/6405* (2013.01); *H04N 21/812* (2013.01); *H04N 21/44016* (2013.01)

(58) Field of Classification Search
CPC .......... H04N 21/8549; H04N 21/4665; H04N 21/252; H04N 21/25883
USPC ..................................... 725/34–36
See application file for complete search history.

(56) References Cited

U.S. PATENT DOCUMENTS

| | | |
|---|---|---|
| 5,319,455 A | 6/1994 | Hoarty et al. |
| 5,978,381 A | 11/1999 | Perlman et al. |
| 7,328,448 B2 | 2/2008 | Eldering et al. |

(Continued)

FOREIGN PATENT DOCUMENTS

| | | |
|---|---|---|
| GB | 2365649 A | 2/2002 |
| WO | 2000010327 | 2/2000 |
| WO | 2010076961 A2 | 7/2010 |

OTHER PUBLICATIONS

Bozios, et al., "Advanced Techniques for Personalized Advertising in a Digital TV Environment: The iMEDIA System", 2001, 7 Pages.

(Continued)

*Primary Examiner* — Pankaj Kumar
*Assistant Examiner* — Sahar Aqil Riaz
(74) *Attorney, Agent, or Firm* — Guntin & Gust, PLC; Ralph Trementozzi (57) ABSTRACT

Aspects of the subject disclosure may include, for example, a system that predicts an interest of a viewer in a media program that will be available for consumption over a content delivery network, determines a first advertisement that may be shown to the viewer during a broadcast of the media program, and transmits the first advertisement to a local device of the viewer in advance of the broadcast of the media program. Other embodiments are disclosed.

18 Claims, 7 Drawing Sheets

(51) Int. Cl.
*H04N 21/81* (2011.01)
*H04N 21/44* (2011.01)

(56) References Cited

U.S. PATENT DOCUMENTS

| | | | |
|---|---|---|---|
| 7,694,318 B2 | 4/2010 | Lienhart et al. | |
| 7,721,306 B2 | 5/2010 | Watanabe et al. | |
| 8,146,128 B2 | 3/2012 | Tanaka et al. | |
| 8,171,511 B2* | 5/2012 | Haberman | H04H 20/103 |
| | | | 725/34 |
| 8,321,889 B2 | 11/2012 | Wong et al. | |
| 8,423,417 B2 | 4/2013 | Heck et al. | |
| 8,516,529 B2* | 8/2013 | Lajoie | H04L 65/4084 |
| | | | 725/87 |
| 8,572,639 B2 | 10/2013 | Ficco | |
| 8,627,356 B2 | 1/2014 | Storan et al. | |
| 8,732,750 B2 | 5/2014 | Wachtfogel et al. | |
| 8,966,524 B2* | 2/2015 | Van Gulik | H04L 29/06027 |
| | | | 725/14 |
| 9,027,053 B2 | 5/2015 | Shah-Nazaroff et al. | |
| 9,392,302 B2 | 7/2016 | Kelman | |
| 10,516,900 B2* | 12/2019 | Grant | H04N 21/26241 |
| 2002/0129362 A1 | 9/2002 | Chang et al. | |
| 2002/0178445 A1 | 11/2002 | Eldering et al. | |
| 2003/0051249 A1 | 3/2003 | Hoang | |
| 2004/0046897 A1 | 3/2004 | Kitatora et al. | |
| 2004/0226035 A1 | 11/2004 | Hauser, Jr. et al. | |
| 2005/0204381 A1* | 9/2005 | Ludvig | H04N 21/44016 |
| | | | 725/34 |
| 2010/0031285 A1* | 2/2010 | Haberman | H04L 67/325 |
| | | | 725/34 |
| 2011/0029385 A1* | 2/2011 | Engel | G06Q 30/02 |
| | | | 705/14.53 |
| 2013/0262386 A1* | 10/2013 | Kottomtharayil | G06F 16/185 |
| | | | 707/635 |
| 2014/0040972 A1* | 2/2014 | Sorlander | H04N 21/23614 |
| | | | 725/127 |
| 2015/0081851 A1* | 3/2015 | Oyman | H04N 7/147 |
| | | | 709/219 |
| 2015/0113570 A1* | 4/2015 | Klarfeld | G11B 27/105 |
| | | | 725/58 |
| 2016/0044078 A1* | 2/2016 | Hosur | H04L 67/02 |
| | | | 709/219 |
| 2016/0173388 A1* | 6/2016 | Alam | H04L 65/4076 |
| | | | 709/219 |
| 2016/0366491 A9 | 12/2016 | Heck et al. | |
| 2017/0085934 A1* | 3/2017 | Evans | H04N 21/25841 |
| 2017/0280181 A1* | 9/2017 | Ramaley | H04L 65/4084 |
| 2018/0376197 A1* | 12/2018 | Gonzalez | H04N 21/44016 |
| 2019/0297359 A1* | 9/2019 | Haberman | H04H 20/103 |
| 2020/0107055 A1* | 4/2020 | Grant | H04N 21/8455 |

OTHER PUBLICATIONS

Guo, Jinlian et al., "AdOn: an intelligent overlay video advertising system", 2009, 2 pages.
Lekakos, et al., "An integrated approach to interactive and personalized TV advertising", 2001, 10 pages.
Li, Yiqun et al., "Real time advertisement insertion in baseball video based on advertisement effect", 2005, 4 pages.
Nicas, et al., U.S. Appl. No. 15/829,135, filed Dec. 1, 2017, 24 pages.
Pramataris, et al., "ersonalized interactive tv advertising: The imedia business model", 2001, 10 pages.

* cited by examiner

SYSTEM AND METHOD FOR PREEMPTIVE ADVERTISEMENT CACHING TO OPTIMIZE NETWORK TRAFFIC

RELATED APPLICATION(S)

U.S. patent application Ser. No. 15/829,135, filed Dec. 1, 2017, by Nicas et al., entitled "Predictive Network Capacity Scaling Based on Customer Interest," which is incorporated by reference herein in its entirety.

FIELD OF THE DISCLOSURE

The subject disclosure relates to caching advertising content.

BACKGROUND

Various techniques have been deployed in content delivery networks to reduce bandwidth consumed by delivery of content. Currently, the main technique for reducing video bandwidth is data compression, which if not lossless, provides a degraded service from delivery of native content. During periods of high network congestion, bandwidth needed to sustain a burst of multimedia traffic is usually not optimized Large scale networks can re-route traffic, or add forecasted bandwidth in anticipation of a large scheduled event (e.g., Super Bowl, World Series, etc.).

BRIEF DESCRIPTION OF THE DRAWINGS

Reference will now be made to the accompanying drawings, which are not necessarily drawn to scale, and wherein.

DETAILED DESCRIPTION

The subject disclosure describes, among other things, illustrative embodiments for a system that predicts an interest of a viewer in a media program that will be available for consumption over a content delivery network, determines a first advertisement that may be shown to the viewer during a broadcast of the media program, and transmits the first advertisement to a local device of the viewer in advance of the broadcast of the media program. Other embodiments are described in the subject disclosure.

One or more aspects of the subject disclosure include a machine-readable storage medium, comprising executable instructions that, when executed by a processing system including a processor, facilitate performance of operations, the operations comprising: predicting an interest of a viewer in a media program that will be available for consumption over a content delivery network, wherein the predicting is based on viewer data; determining a first advertisement that may be shown to the viewer during a broadcast of the media program; and transmitting the first advertisement to a local device of the viewer in advance of the broadcast of the media program.

One or more aspects of the subject disclosure include a method, comprising: determining, by a processing system including a processor, a predicted level of interest of a viewer in a media program that will be available for consumption over a content delivery network, wherein the predicted level of interest is based on viewer data; identifying, by the processing system, a first advertisement that may be shown to the viewer during a broadcast of the media program; and transmitting, by the processing system, the first advertisement to a local device of the viewer; and cuing, by the processing system, the local device to display the first advertisement.

One or more aspects of the subject disclosure include a local device, comprising: a processing system including a processor; and a memory that stores executable instructions that, when executed by the processing system, facilitate performance of operations, the operations comprising: providing viewer data to a content delivery network, wherein the viewer data is used to predict selection of a media program that will be available from a broadcast over the content delivery network; receiving a first advertisement in advance of the broadcast of the media program; storing the first advertisement in a cache; and displaying the first advertisement in response to receiving a cue from the content delivery network.

Figure 1:
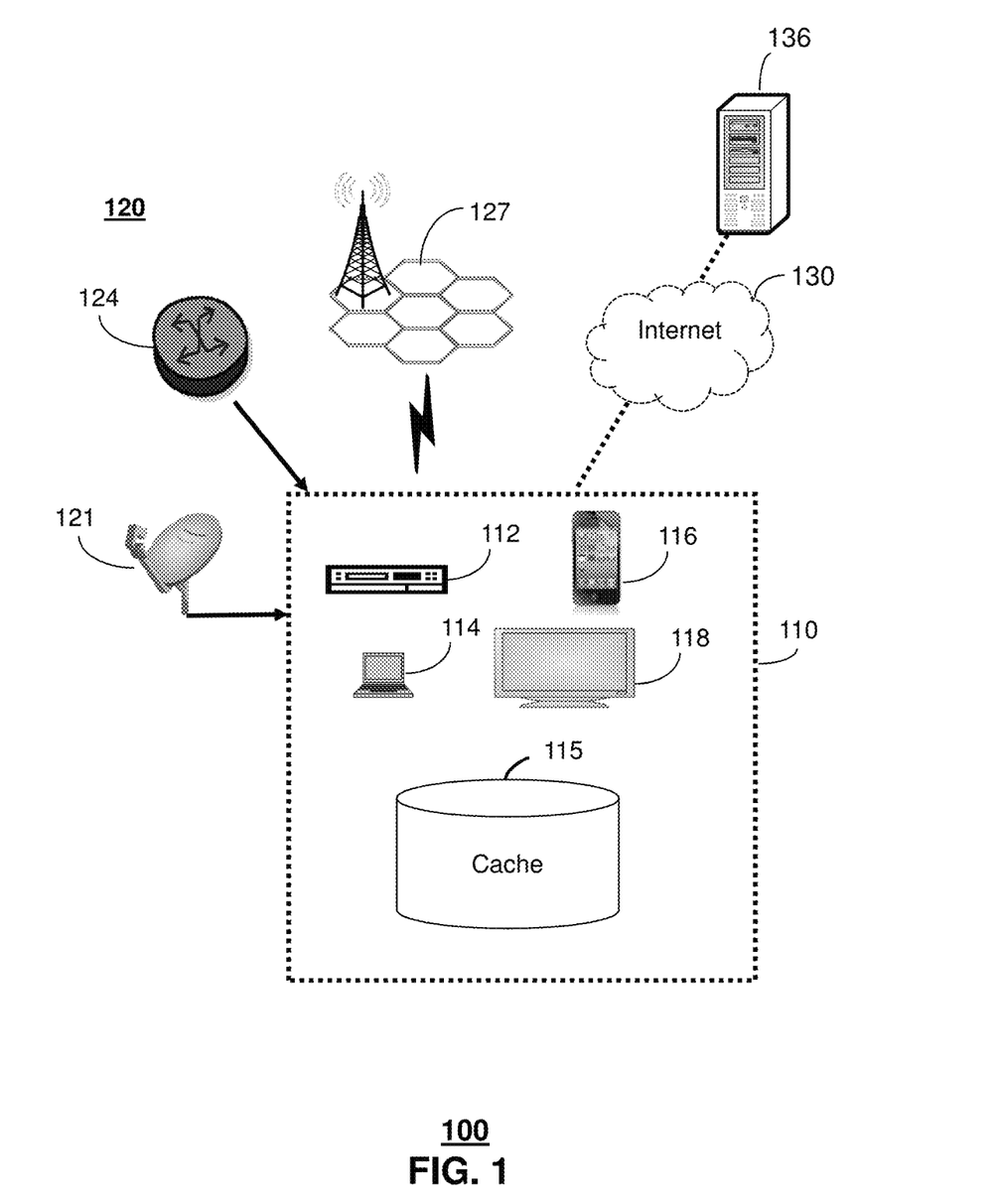
FIG. 1 depicts an illustrative embodiment of a system for preemptive advertising caching to optimize future network traffic.

FIG. 1 depicts an illustrative embodiment of a system for preemptive advertising caching to optimize future network traffic. As illustrated in FIG. 1, system 100 comprises a local device 110 that is in communication with a content delivery network 120, and an ad playout server, or APS 136 via a network, such as Internet 130. The local device 110 can be any of a set top box, hereinafter media processor 112, a computer or tablet 114, a cellular telephone 116, a smart television 118, or the like. The local device 110 further comprises a storage memory, hereinafter cache 115.

Local device 110 receives media content from a content delivery network 120. Content delivery network 120 may comprise a satellite dish receiver 121, an Internet Protocol television system (IPTV) network 124, a cable TV network (not illustrated), a cellular network 127, or a combination thereof. Network conditions can include the capacity of the content delivery network 120 in terms of either bandwidth or bit rate, latency or delay, noise or distortion, and/or jitter caused by the content delivery network 120 on data flowing through the content delivery network 120. Media content received from the content delivery network 120 can be a live broadcast program, a pre-recorded program, or on-demand content, such as video on demand (VOD), a digital video recorder (DVR), or other streaming services such as YouTube,™ Twitch,™ Facebook Live, or the like. Typically, the content delivery network 120 can deliver media content to each local device 110 using point-to-point protocols known in the art, such as transmission control protocol (TCP)/Internet Protocol (IP) or user datagram protocol (UDP)/IP. However, content delivery network 120 may also comprise multicasting routers that enable more efficient content delivery using multicasting protocols as well. Advertisement content may be included with the media content, or may be delivered separately via the APS 136, as set forth in more detail below.

Figure 2A:
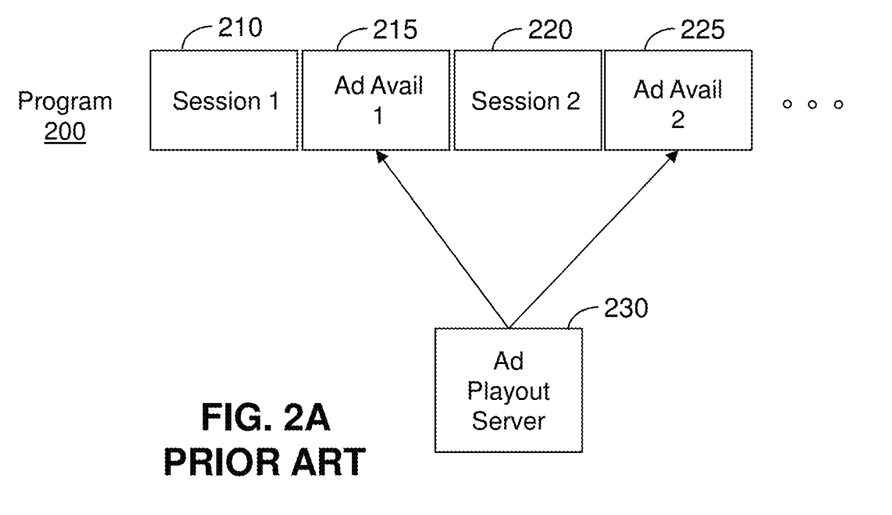
FIG. 2A depicts delivery of advertisement content known in the prior art.

FIG. 2A depicts delivery of advertisement content known in the prior art. As shown in FIG. 2A, a program 200 comprises a plurality of sessions 210, 220, each session including media content for the program, and interspersed between sessions, one or more available time slots, known as "ad avails" 215, 225 for advertisements. Insertion of an advertisement (also referred to as an "Ad" or "ad") in linear (or live) broadcast TV is traditionally performed using Society of Cable Telecommunications Engineers (SCTE) standards such as, for example, the American National Standards Institute (ANSI)/SCTE 35 standard, titled "Digital Program Insertion Cueing Message for Cable" (2013), available at www.scte.org; the relevant disclosure of this standard is incorporated herein by reference in its entirety. As part of such ad insertion, SCTE 35 markers—which may also be referred to as "ad insertion markers" or "splice information tables"—are carried in the broadcast content to denote the end of the session, and indicate the presence of ad insertion points or "splice events." Other techniques known in the art may be deployed. A splice information table notifies downstream devices of splice events, such as a break in the network programming offering the opportunity to insert ads or a return from a network break. A splice information table, which pertains to a given program, is carried in one or more Packet Identifiers (PIDs) referred to by that program's Program Map Table (PMT). For example, advertisements having a broad geographical scope, such as nationwide advertisements, will not be included in the splice information table, because preemption of such ads may not be permitted. However, in other cases, the ad avail normally held by a nationwide advertisement might be release. Alternatively, other contractual or business arrangements might be made where an ad avail may occur during a media program.

The timing information provided through an SCTE 35 marker may be used by a splicer (not illustrated) in the television service provider's headend, or an APS 230 in the content delivery network. The splicer or APS 230 may launch a query for an appropriate advertisement to place at an ad insertion point—in the Motion Picture Experts Group 2 (MPEG2) Transport Stream (TS) of the broadcast content—identified by the corresponding SCTE 35 marker or to replace an existing ad already inserted. The replacement may occur either at the national headend, downstream of the headend, or even at the local device. The splicer or APS 230 may perform such querying using the SCTE-130 protocol defined, for example, in the ANSI/SCTE 130-1 document, titled "Digital Program Insertion—Advertising Systems Interfaces Part 1: Advertising Systems Overview" (2013), available at www.scte.org, and in the ANSI/SCTE 130-3 document, titled "Digital Program Insertion—Advertising Systems Interfaces Part 3: Ad Management Service (ADM) Interface" (2013), available at www.scte.org; the relevant disclosures of both of these documents are incorporated herein by reference in their entirety.

The content delivery network may use data from back-end server(s) or database(s) such as data related to ongoing ad campaigns, regional demographic information, data about the channel being watched, and the like, to decide on the advertisement to be placed. The content delivery network returns this information—about the ad to be placed—to the APS 230, which may then obtain the appropriate ad and splice it seamlessly at the ad insertion point, as cued by the marker. The MPEG2 TS, with such ads inserted by a splicer, is then delivered to the local device. Alternatively, the APS 230 delivers the ads directly to the local device, which seamlessly displays the ad through the user interface (UI) associated with the local device.

Figure 2B:
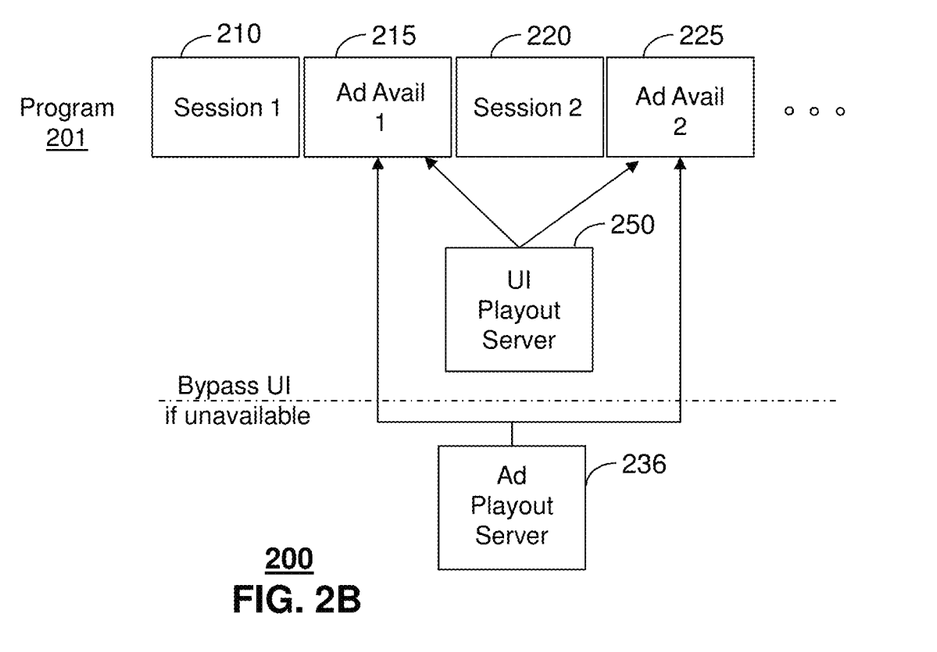
FIG. 2B depicts an illustrative embodiment of delivery of advertisement content.

FIG. 2B depicts an illustrative embodiment of delivery of advertisement content. As shown in FIG. 2B, a program 201 comprises a plurality of sessions 210, 220, and ad avails 215, 225. In contrast to the prior art, the APS 236 may use data from back-end server(s) or database(s) such as data related to ongoing ad campaigns, regional demographic information, data about the channel being watched, and the like, to decide on an advertisement to be placed, in advance of the program broadcast. The APS 236 may then obtain the appropriate ad and provide it to a user interface (UI) playout server (UPS) 250, which is stored in the cache of the local device. During the broadcast, the marker cues the UPS to retrieve the advertisement from the cache in the local device and splice the advertisement seamlessly at the ad insertion point. If the UPS is not available, not functioning correctly, or if there is a need to override the ad to be spliced by the UPS, the APS 236 may bypass the UPS and provide the ad directly to the local device, as cued by the marker.

The system saves content delivery network bandwidth during high traffic times and gives the ability to provide targeted/advanced/national/local/generic ad insertion to viewers on demand Instead of using APS 236 to transmit the advertising content to the end user's local device during a scheduled "ad avail," the advertising content is pushed to a local cache in the end user device in advance of the "ad avail." This method can even be used whenever ad avails are released, and can be filled with advertisements that have been targeted for the end user and previously cached. In an embodiment, the system downloads advertising metadata to a local UI cache in off peak times for live streaming content that has been identified as a "high interest event" as profiled by the user's interest inventory. Thus, network congestion can be lessened when other payloads are being transmitted during high demand times or VOD performances in the content delivery network.

In an embodiment, a user's interest profile can be used to create a probability report that drives the cache, thereby preventing unscheduled increases in network bandwidth allocation, and can be used for traffic shaping to meet the demand, thus resulting in a better user experience. Viewer data patterns can be utilized to predict future viewer usage over a content delivery network. The data patterns may include, for instance, viewer search and media consumption patterns, as well as demographic and/or geographic patterns. Viewer data can be correlated with media programs having a high anticipated viewership, i.e., potentially popular media programs. This allows the content delivery network provider to identify when and where (e.g., specific geographic regions, specific windows of time, etc.) the content delivery network may experience an unforeseen spike in network traffic, and to fill the local cache with advertisements in advance of the media consumption.

For example, in an exemplary embodiment, the system preloads all of the Super Bowl commercials from cloud storage/playoff server to the local device cache during off peak times, possibly over a different network from the content delivery network (satellite, cable, cellular, etc.) broadcast, such as the Internet, for a user predicted to watch the Super Bowl. When the game comes on, the marker cues the first commercial break, which triggers the appropriate ads to play from the cache, rather than to be downloaded from the APS 236. Meanwhile, the user's local device can still use the content delivery network to refill the local device's broadcast buffers, or if full, network load for the entire commercial break can be reduced on the content delivery network.

Figure 3:
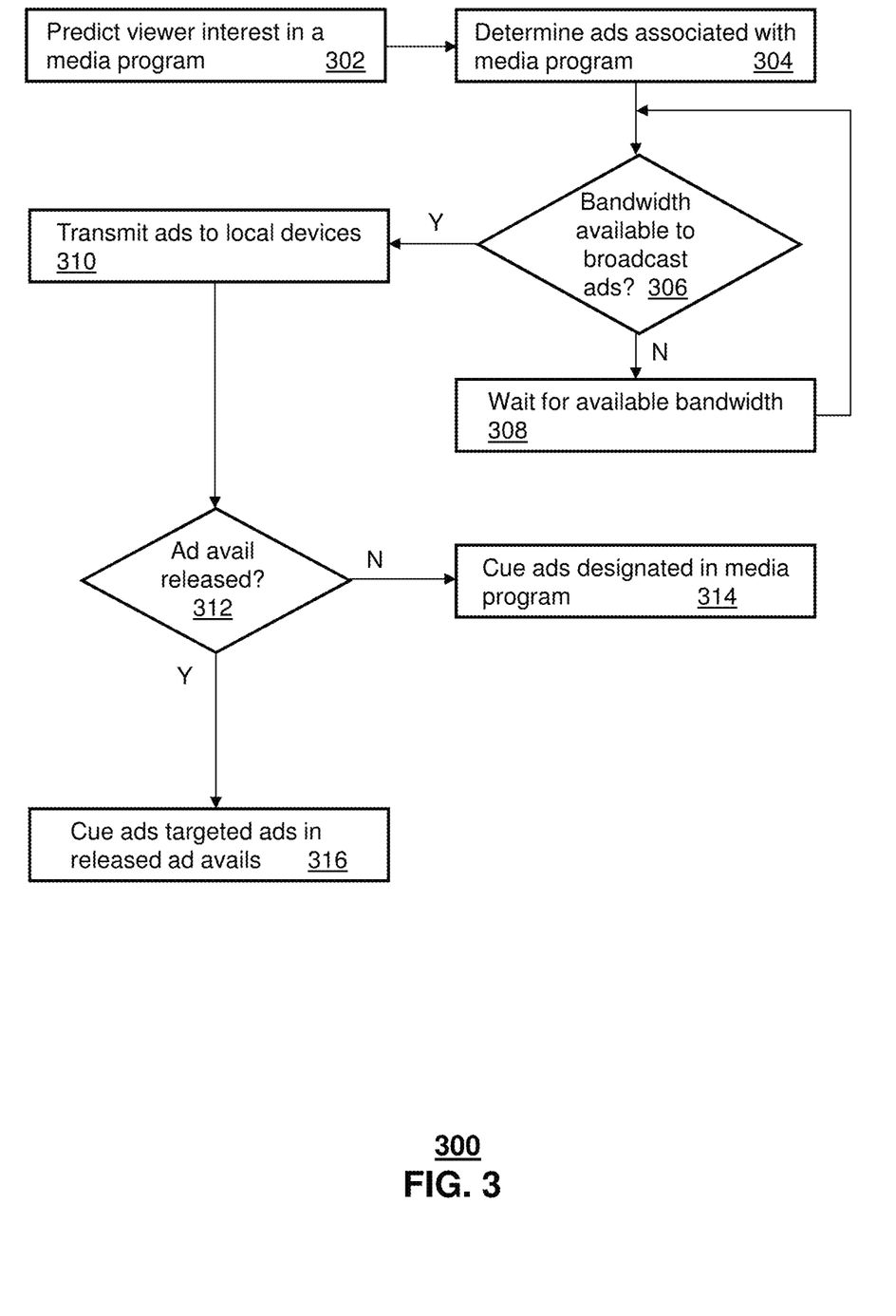
FIG. 3 depicts an illustrative embodiment of a method used in portions of the system described in FIGS. 1 and 2B.

FIG. 3 depicts an illustrative embodiment of a method used by a system for preemptive advertisement caching to optimize network traffic. As shown in FIG. 3, method 300 begins at step 302, where the system predicts viewer interest in a media program. Various means of prediction are discussed above. Next, in step 304, the system determines ads associated with the media program. Such ads may be specified by the content delivery network, by contract, or otherwise. Alternatively or additionally, in an embodiment, targeted advertising may be determined for a particular user.

In step 306, the system determines whether there is sufficient bandwidth available in the network to broadcast the ads determined in the previous step. If there is insufficient bandwidth, the system will wait, in step 308, for a period of low utilization, when network traffic has lessened and the network has available bandwidth, and then broadcast the advertisements to the local devices, as indicated by step 310.

Next, in step 312, the system determines whether an ad avail has been released. If not, then in step 314, the system cues the local device, which retrieves the previously broadcasted ads designated by the media program and displays the previously broadcasted ads. However, if the ad avail has been released, then in step 316, the system cues the local device to display an alternative ad, such as the targeted advertising that was previously sent to the local device in a time slot previously allocated to another advertisement.

While for purposes of simplicity of explanation, the respective processes are shown and described as a series of blocks in FIG. 3, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

Figure 4:
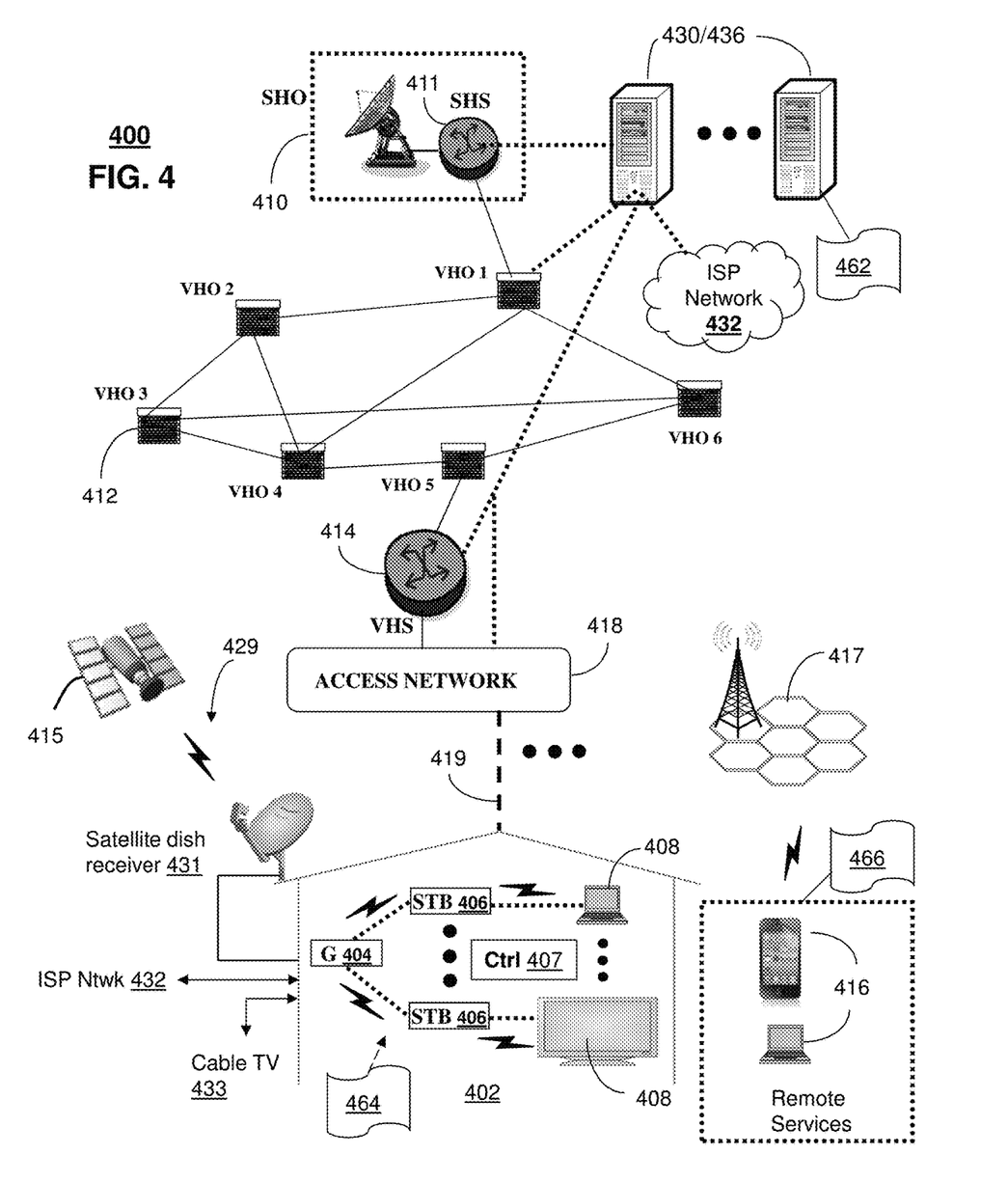
FIGS. 4-5 depict illustrative embodiments of communication systems that provide media services to the system of FIG. 1.

FIG. 4 depicts an illustrative embodiment of a communication system 400 for providing various communication services, such as delivering media content. The communication system 400 can represent an interactive media network, such as an interactive television system (e.g., an Internet Protocol Television (IPTV) media system). Communication system 400 can be overlaid or operably coupled with system 100 of FIGS. 1 and/or 2B as another representative embodiment of communication system 400. For instance, one or more devices illustrated in the communication system 400 of FIG. 4 can support or be the content delivery network illustrated in system 100 of FIG. 1.

In one or more embodiments, the communication system 400 can include a super head-end office (SHO) 410 with at least one super headend office server (SHS) 411 which receives media content from satellite and/or terrestrial communication systems. In the present context, media content can represent, for example, audio content, moving image content such as 2D or 3D videos, video games, virtual reality content, still image content, and combinations thereof. The SHS server 411 can forward packets associated with the media content to one or more video head-end servers (VHS) 414 via a network of video head-end offices (VHO) 412 according to a multicast communication protocol. The VHS 414 can distribute multimedia broadcast content via an access network 418 to commercial and/or residential buildings 402 housing a gateway 404 (such as a residential or commercial gateway).

The access network 418 can represent a group of digital subscriber line access multiplexers (DSLAMs) located in a central office or a service area interface that provide broadband services over fiber optical links or copper twisted pairs 419 to buildings 402. The gateway 404 can use communication technology to distribute broadcast signals to media processors 406 such as Set-Top Boxes (STBs) which in turn present broadcast channels to media devices 408 such as computers or television sets managed in some instances by a media controller 407 (such as an infrared or RF remote controller).

The gateway 404, the media processors 406, and media devices 408 can utilize tethered communication technologies (such as coaxial, powerline or phone line wiring) or can operate over a wireless access protocol such as Wireless Fidelity (WiFi), Bluetooth®, ZigBee®, or other present or next generation local or personal area wireless network technologies. By way of these interfaces, unicast communications can also be invoked between the media processors 406 and subsystems of the IPTV media system for services such as video-on-demand (VoD), browsing an electronic programming guide (EPG), or other infrastructure services.

A satellite broadcast television system 429 can be used in the media system of FIG. 4. The satellite broadcast television system can be overlaid, operably coupled with, or replace the IPTV system as another representative embodiment of communication system 400. In this embodiment, signals transmitted by a satellite 415 that include media content can be received by a satellite dish receiver 431 coupled to the building 402. Modulated signals received by the satellite dish receiver 431 can be transferred to the media processors 406 for demodulating, decoding, encoding, and/or distributing broadcast channels to the media devices 408. The media processors 406 can be equipped with a broadband port to an Internet Service Provider (ISP) network 432 to enable interactive services such as VoD and EPG as described above.

In yet another embodiment, an analog or digital cable broadcast distribution system such as cable TV system 433 can be overlaid, operably coupled with, or replace the IPTV system and/or the satellite TV system as another representative embodiment of communication system 400. In this embodiment, the cable TV system 433 can also provide Internet, telephony, and interactive media services. System 400 enables various types of interactive television and/or services including IPTV, cable and/or satellite.

The subject disclosure can apply to other present or next generation over-the-air and/or landline media content services system.

Some of the network elements of the IPTV media system can be coupled to one or more computing devices 430, a portion of which can operate as a web server for providing web portal services over the ISP network 432 to wireline media devices 408 or wireless communication devices 416.

Communication system 400 can also provide for all or a portion of the computing devices 430 to function as an ad playout server (herein referred to as APS 436). The APS 436 can use computing and communication technology to perform function 462, which can include among other things, the advertising caching techniques described by method 300 of FIG. 3. For instance, function 462 of server 430 can be similar to the functions described for APS 136 of FIG. 1 or APS 236 of FIG. 2B in accordance with method 300 of FIG. 3. The media processors 406 and wireless communication devices 416 can be provisioned with software functions 464 and 466, respectively, to utilize the services of APS 436. For instance, functions 464 and 466 of media processors 406 and wireless communication devices 416 can be similar to the functions described for the local devices 112, 114, 116 and 118 of FIG. 1 in accordance with method 300.

Multiple forms of media services can be offered to media devices over landline technologies such as those described above. Additionally, media services can be offered to media devices by way of a wireless access base station 417 operating according to common wireless access protocols such as Global System for Mobile or GSM, Code Division Multiple Access or CDMA, Time Division Multiple Access or TDMA, Universal Mobile Telecommunications or UMTS, World interoperability for Microwave or WiMAX, Software Defined Radio or SDR, Long Term Evolution or LTE, and so on. Other present and next generation wide area wireless access network technologies can be used in one or more embodiments of the subject disclosure.

Figure 5:
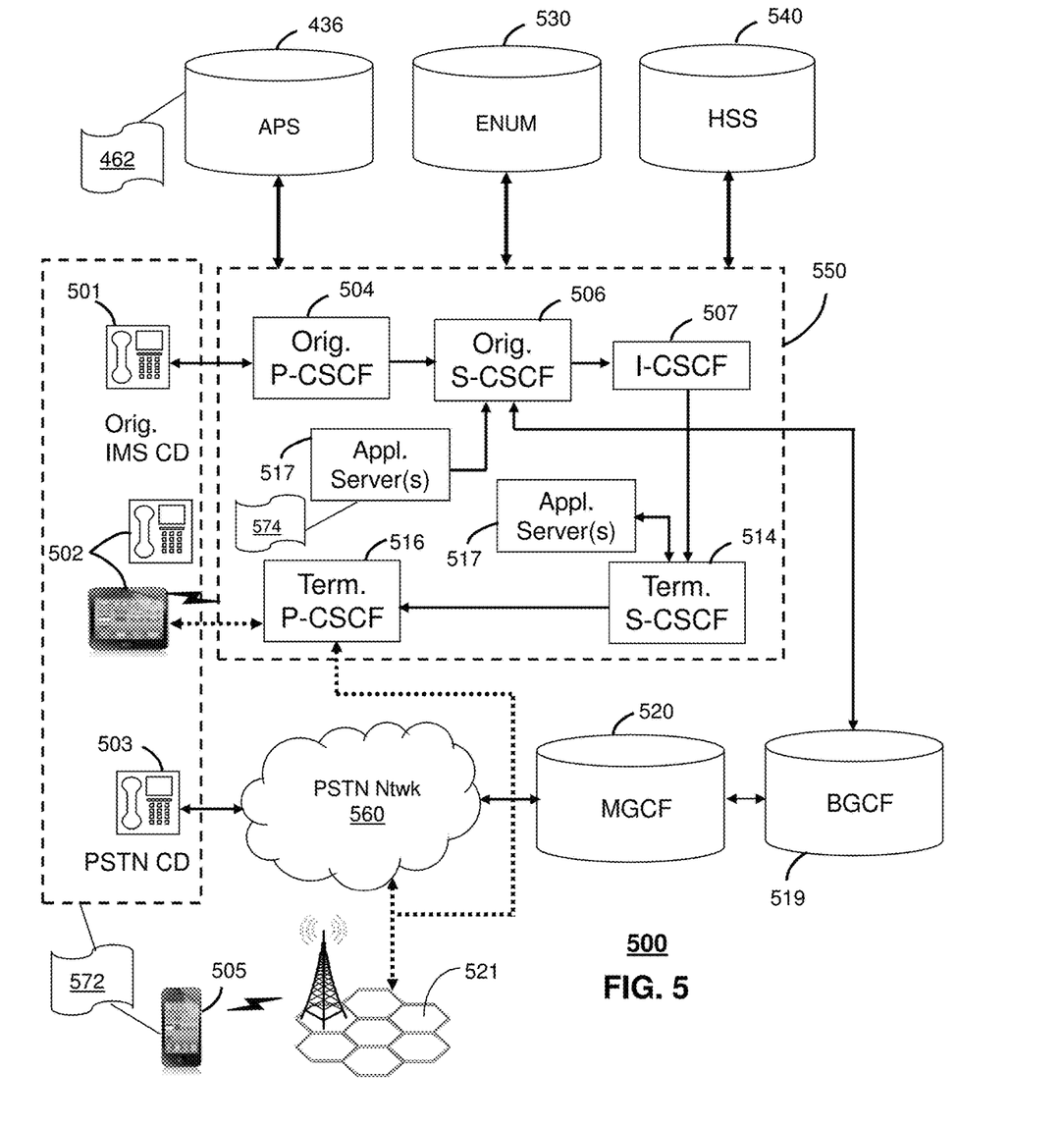

FIG. 5 depicts an illustrative embodiment of a communication system 500 employing an IP Multimedia Subsystem (IMS) network architecture to facilitate the combined services of circuit-switched and packet-switched systems. Communication system 500 can be overlaid or operably coupled with system 100 of FIG. 1 and communication system 400 as another representative embodiment of communication system 400. The communication system 500 can perform as a content delivery network that predicts an interest of a viewer in a media program that will be available for consumption over the content delivery network, determines a first advertisement that may be shown to the viewer during a broadcast of the media program, and transmits the first advertisement to a local device of the viewer in advance of the broadcast of the media program.

Communication system 500 can comprise a Home Subscriber Server (HSS) 540, a tElephone NUmber Mapping (ENUM) server 530, and other network elements of an IMS network 550. The IMS network 550 can establish communications between IMS-compliant communication devices (CDs) 501, 502, Public Switched Telephone Network (PSTN) CDs 503, 505, and combinations thereof by way of a Media Gateway Control Function (MGCF) 520 coupled to a PSTN network 560. The MGCF 520 need not be used when a communication session involves IMS CD to IMS CD communications. A communication session involving at least one PSTN CD may utilize the MGCF 520.

IMS CDs 501, 502 can register with the IMS network 550 by contacting a Proxy Call Session Control Function (P-CSCF) which communicates with an interrogating CSCF (I-CSCF), which in turn, communicates with a Serving CSCF (S-CSCF) to register the CDs with the HSS 540. To initiate a communication session between CDs, an originating IMS CD 501 can submit a Session Initiation Protocol (SIP INVITE) message to an originating P-CSCF 504 which communicates with a corresponding originating S-CSCF 506. The originating S-CSCF 506 can submit the SIP INVITE message to one or more application servers (ASs) 517 that can provide a variety of services to IMS subscribers.

For example, the application servers 517 can be used to perform originating call feature treatment functions on the calling party number received by the originating S-CSCF 506 in the SIP INVITE message. Originating treatment functions can include determining whether the calling party number has international calling services, call ID blocking, calling name blocking, 7-digit dialing, and/or is requesting special telephony features (e.g., *72 forward calls, *73 cancel call forwarding, *67 for caller ID blocking, and so on). Based on initial filter criteria (iFCs) in a subscriber profile associated with a CD, one or more application servers may be invoked to provide various call originating feature services.

Additionally, the originating S-CSCF 506 can submit queries to the ENUM system 530 to translate an E.164 telephone number in the SIP INVITE message to a SIP Uniform Resource Identifier (URI) if the terminating communication device is IMS-compliant. The SIP URI can be used by an Interrogating CSCF (I-CSCF) 507 to submit a query to the HSS 540 to identify a terminating S-CSCF 514 associated with a terminating IMS CD such as reference 502. Once identified, the I-CSCF 507 can submit the SIP INVITE message to the terminating S-CSCF 514. The terminating S-CSCF 514 can then identify a terminating P-CSCF 516 associated with the terminating CD 502. The P-CSCF 516 may then signal the CD 502 to establish Voice over Internet Protocol (VoIP) communication services, thereby enabling the calling and called parties to engage in voice and/or data communications. Based on the iFCs in the subscriber profile, one or more application servers may be invoked to provide various call terminating feature services, such as call forwarding, do not disturb, music tones, simultaneous ringing, sequential ringing, etc.

In some instances the aforementioned communication process is symmetrical. Accordingly, the terms "originating" and "terminating" in FIG. 5 may be interchangeable. It is further noted that communication system 500 can be adapted to support video conferencing. In addition, communication system 500 can be adapted to provide the IMS CDs 501, 502 with the multimedia and Internet services of communication system 400 of FIG. 4.

If the terminating communication device is instead a PSTN CD such as CD 503 or CD 505 (in instances where the cellular phone only supports circuit-switched voice communications), the ENUM system 530 can respond with an unsuccessful address resolution which can cause the originating S-CSCF 506 to forward the call to the MGCF 520 via a Breakout Gateway Control Function (BGCF) 519. The MGCF 520 can then initiate the call to the terminating PSTN CD over the PSTN network 560 to enable the calling and called parties to engage in voice and/or data communications.

It is further appreciated that the CDs of FIG. 5 can operate as wireline or wireless devices. For example, the CDs of FIG. 5 can be communicatively coupled to a cellular base station 521, a femtocell, a WiFi router, a Digital Enhanced Cordless Telecommunications (DECT) base unit, or another suitable wireless access unit to establish communications with the IMS network 550 of FIG. 5. The cellular access base station 521 can operate according to common wireless access protocols such as GSM, CDMA, TDMA, UMTS, WiMax, SDR, LTE, and so on. Other present and next generation wireless network technologies can be used by one or more embodiments of the subject disclosure. Accordingly, multiple wireline and wireless communication technologies can be used by the CDs of FIG. 5.

Cellular phones supporting LTE can support packet-switched voice and packet-switched data communications and thus may operate as IMS-compliant mobile devices. In this embodiment, the cellular base station 521 may communicate directly with the IMS network 550 as shown by the arrow connecting the cellular base station 521 and the P-CSCF 516.

Alternative forms of a CSCF can operate in a device, system, component, or other form of centralized or distributed hardware and/or software. Indeed, a respective CSCF may be embodied as a respective CSCF system having one or more computers or servers, either centralized or distributed, where each computer or server may be configured to perform or provide, in whole or in part, any method, step, or functionality described herein in accordance with a respective CSCF. Likewise, other functions, servers and computers described herein, including but not limited to, the HSS, the ENUM server, the BGCF, and the MGCF, can be embodied in a respective system having one or more computers or servers, either centralized or distributed, where each computer or server may be configured to perform or provide, in whole or in part, any method, step, or functionality described herein in accordance with a respective function, server, or computer.

The APS 436 of FIG. 4 can be operably coupled to communication system 500 for purposes similar to those described above. APS 436 can perform function 462 and thereby provide ad playout services to the CDs 501, 502, 503 and 505 of FIG. 5 similar to the functions described for APS 136 of FIG. 1 in accordance with method 300 of FIG. 3. CDs 501, 502, 503 and 505, which can be adapted with software to perform function 572 to utilize the services of the APS 436 similar to the functions described for local devices 112, 114, 116 and 118 of FIG. 1 in accordance with method 300 of FIG. 3. APS 436 can be an integral part of the application server(s) 517 performing function 574, which can be substantially similar to function 462 and adapted to the operations of the IMS network 550.

For illustration purposes only, the terms S-CSCF, P-CSCF, I-CSCF, and so on, can be server devices, but may be referred to in the subject disclosure without the word "server." It is also understood that any form of a CSCF server can operate in a device, system, component, or other form of centralized or distributed hardware and software. It is further noted that these terms and other terms such as DIAMETER commands are terms can include features, methodologies, and/or fields that may be described in whole or in part by standards bodies such as 3$^{rd}$ Generation Partnership Project (3GPP). It is further noted that some or all embodiments of the subject disclosure may in whole or in part modify, supplement, or otherwise supersede final or proposed standards published and promulgated by 3GPP.

Figure 6:
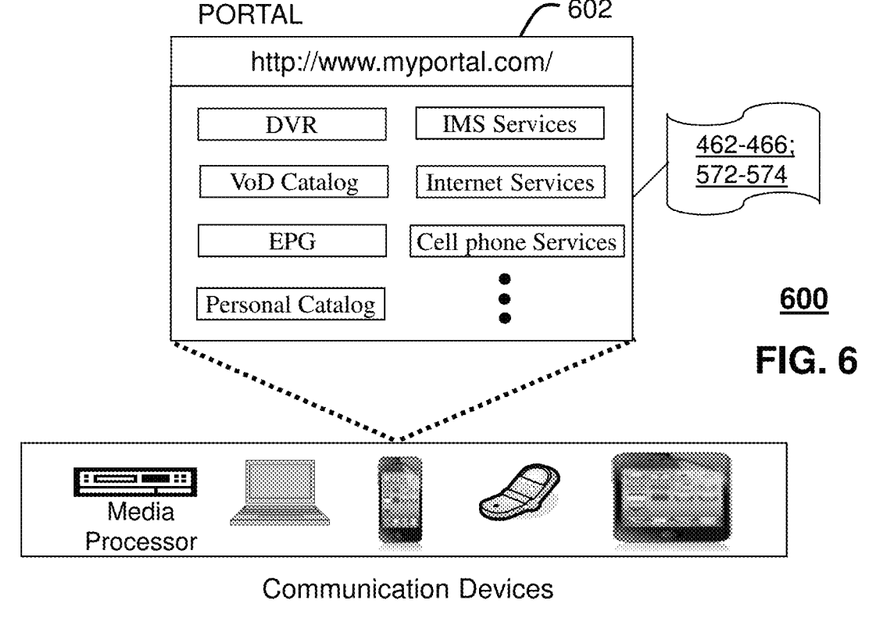
FIG. 6 depicts an illustrative embodiment of a web portal for interacting with the communication systems of FIGS. 1 and 4-5.

FIG. 6 depicts an illustrative embodiment of a web portal 602 of a communication system 600. Communication system 600 can be overlaid or operably coupled with system 100 of FIG. 1, communication system 400, and/or communication system 500 as another representative embodiment of system 100 of FIG. 1, communication system 400, and/or communication system 500. The web portal 602 can be used for managing services of system 100 of FIG. 1 and communication systems 400-500. A web page of the web portal 602 can be accessed by a Uniform Resource Locator (URL) with an Internet browser using an Internet-capable communication device such as those described in FIG. 1 and FIGS. 4-5. The web portal 602 can be configured, for example, to access a media processor 406 and services managed thereby such as a Digital Video Recorder (DVR), a Video on Demand (VoD) catalog, an Electronic Programming Guide (EPG), or a personal catalog (such as personal videos, pictures, audio recordings, etc.) stored at the media processor 406. The web portal 602 can also be used for provisioning IMS services described earlier, provisioning Internet services, provisioning cellular phone services, and so on.

The web portal 602 can further be utilized to manage and provision software applications 462-466, and 572-574 to adapt these applications as may be desired by subscribers and/or service providers of system 100 of FIG. 1, and communication systems 400-500. For instance, users of the services provided by APS 136, APS 236, server 430 or APS 436 can log into their on-line accounts and provision the APS 136, server 430, or other servers in the content delivery network 120 with user profiles, viewer data, or provide contact information to server to enable it to associate users with local devices described in FIG. 1, or communication devices described in FIGS. 4-5, and so on. Service providers can log onto an administrator account to provision, monitor and/or maintain the system 100 of FIG. 1 and/or server 430 or APS 436.

Figure 7:
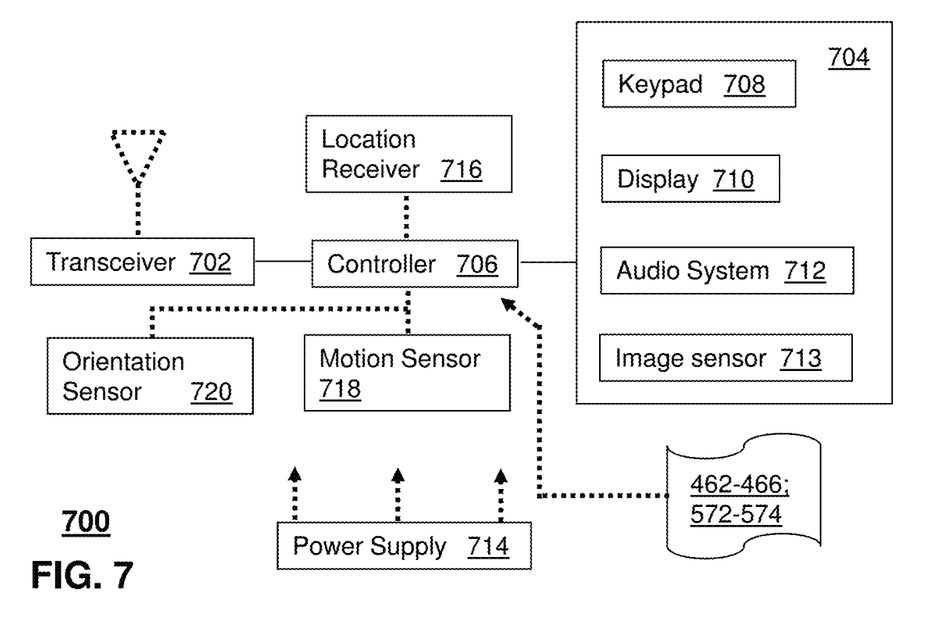
FIG. 7 depicts an illustrative embodiment of a communication device.

FIG. 7 depicts an illustrative embodiment of a communication device 700. Communication device 700 can serve in whole or in part as an illustrative embodiment of the local devices 112, 114, 116 or 118 depicted in FIG. 1, and FIGS. 4-5 and can be configured to perform portions of method 300 of FIG. 3.

Communication device 700 can comprise a wireline and/or wireless transceiver 702 (herein transceiver 702), a user interface (UI) 704, a power supply 714, a location receiver 716, a motion sensor 718, an orientation sensor 720, and a controller 706 for managing operations thereof. The transceiver 702 can support short-range or long-range wireless access technologies such as Bluetooth®, ZigBee®, WiFi, DECT, or cellular communication technologies, just to mention a few (Bluetooth® and ZigBee® are trademarks registered by the Bluetooth® Special Interest Group and the ZigBee® Alliance, respectively). Cellular technologies can include, for example, CDMA-1λ, UMTS/HSDPA, GSM/GPRS, TDMA/EDGE, EV/DO, WiMAX, SDR, LTE, as well as other next generation wireless communication technologies as they arise. The transceiver 702 can also be adapted to support circuit-switched wireline access technologies (such as PSTN), packet-switched wireline access technologies (such as TCP/IP, VoIP, etc.), and combinations thereof.

The UI 704 can include a depressible or touch-sensitive keypad 708 with a navigation mechanism such as a roller ball, a joystick, a mouse, or a navigation disk for manipulating operations of the communication device 700. The keypad 708 can be an integral part of a housing assembly of the communication device 700 or an independent device operably coupled thereto by a tethered wireline interface (such as a USB cable) or a wireless interface supporting for example Bluetooth®. The keypad 708 can represent a numeric keypad commonly used by phones, and/or a QWERTY keypad with alphanumeric keys. The UI 704 can further include a display 710 such as monochrome or color LCD (Liquid Crystal Display), OLED (Organic Light Emitting Diode) or other suitable display technology for conveying images to an end user of the communication device 700. In an embodiment where the display 710 is touch-sensitive, a portion or all of the keypad 708 can be presented by way of the display 710 with navigation features.

The display 710 can use touch screen technology to also serve as a user interface for detecting user input. As a touch screen display, the communication device 700 can be adapted to present a user interface with graphical user interface (GUI) elements that can be selected by a user with a touch of a finger. The touch screen display 710 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 710 can be an integral part of the housing assembly of the communication device 700 or an independent device communicatively coupled thereto by a tethered wireline interface (such as a cable) or a wireless interface.

The UI 704 can also include an audio system 712 that utilizes audio technology for conveying low volume audio (such as audio heard in proximity of a human ear) and high volume audio (such as speakerphone for hands free operation). The audio system 712 can further include a microphone for receiving audible signals of an end user. The audio system 712 can also be used for voice recognition applications. The UI 704 can further include an image sensor 713 such as a charged coupled device (CCD) camera for capturing still or moving images.

The power supply 714 can utilize common power management technologies such as replaceable and rechargeable batteries, supply regulation technologies, and/or charging system technologies for supplying energy to the components of the communication device 700 to facilitate long-range or short-range portable applications. Alternatively, or in combination, the charging system can utilize external power sources such as DC power supplied over a physical interface such as a USB port or other suitable tethering technologies.

The location receiver 716 can utilize location technology such as a global positioning system (GPS) receiver capable of assisted GPS for identifying a location of the communication device 700 based on signals generated by a constellation of GPS satellites, which can be used for facilitating location services such as navigation. The motion sensor 718 can utilize motion sensing technology such as an accelerometer, a gyroscope, or other suitable motion sensing technology to detect motion of the communication device 700 in three-dimensional space. The orientation sensor 720 can utilize orientation sensing technology such as a magnetometer to detect the orientation of the communication device 700 (north, south, west, and east, as well as combined orientations in degrees, minutes, or other suitable orientation metrics).

The communication device 700 can use the transceiver 702 to also determine a proximity to a cellular, WiFi, Bluetooth®, or other wireless access points by sensing techniques such as utilizing a received signal strength indicator (RSSI) and/or signal time of arrival (TOA) or time of flight (TOF) measurements. The controller 706 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 700.

Other components not shown in FIG. 7 can be used in one or more embodiments of the subject disclosure. For instance, the communication device 700 can include a reset button (not shown). The reset button can be used to reset the controller 706 of the communication device 700. In yet another embodiment, the communication device 700 can also include a factory default setting button positioned, for example, below a small hole in a housing assembly of the communication device 700 to force the communication device 700 to re-establish factory settings. In this embodiment, a user can use a protruding object such as a pen or paper clip tip to reach into the hole and depress the default setting button. The communication device 700 can also include a slot for adding or removing an identity module such as a Subscriber Identity Module (SIM) card. SIM cards can be used for identifying subscriber services, executing programs, storing subscriber data, and so forth.

The communication device 700 as described herein can operate with more or less of the circuit components shown in FIG. 7. These variant embodiments can be used in one or more embodiments of the subject disclosure.

The communication device 700 can be adapted to perform the functions of local devices 112, 114, 116 or 118 of FIG. 1, the media processor 406, the media devices 408, or the portable communication devices 416 of FIG. 4, as well as the IMS CDs 501-502 and PSTN CDs 503-505 of FIG. 5. It will be appreciated that the communication device 700 can also represent other devices that can operate in system 100 of FIG. 1, communication systems 400-500 of FIGS. 4-5 such as a gaming console and a media player. In addition, the controller 706 can be adapted in various embodiments to perform the functions 462-466 and 572-574, respectively.

Upon reviewing the aforementioned embodiments, it would be evident to an artisan with ordinary skill in the art that said embodiments can be modified, reduced, or enhanced without departing from the scope of the claims described below. For example, other types of markers could be used to delineate ad positions in the program. Further, the system can be used for Internet streaming services where advertising might be embedded in the frame of the program. Other embodiments can be used in the subject disclosure.

It should be understood that devices described in the exemplary embodiments can be in communication with each other via various wireless and/or wired methodologies. The methodologies can be links that are described as coupled, connected and so forth, which can include unidirectional and/or bidirectional communication over wireless paths and/or wired paths that utilize one or more of various protocols or methodologies, where the coupling and/or connection can be direct (e.g., no intervening processing device) and/or indirect (e.g., an intermediary processing device such as a router).

Figure 8:
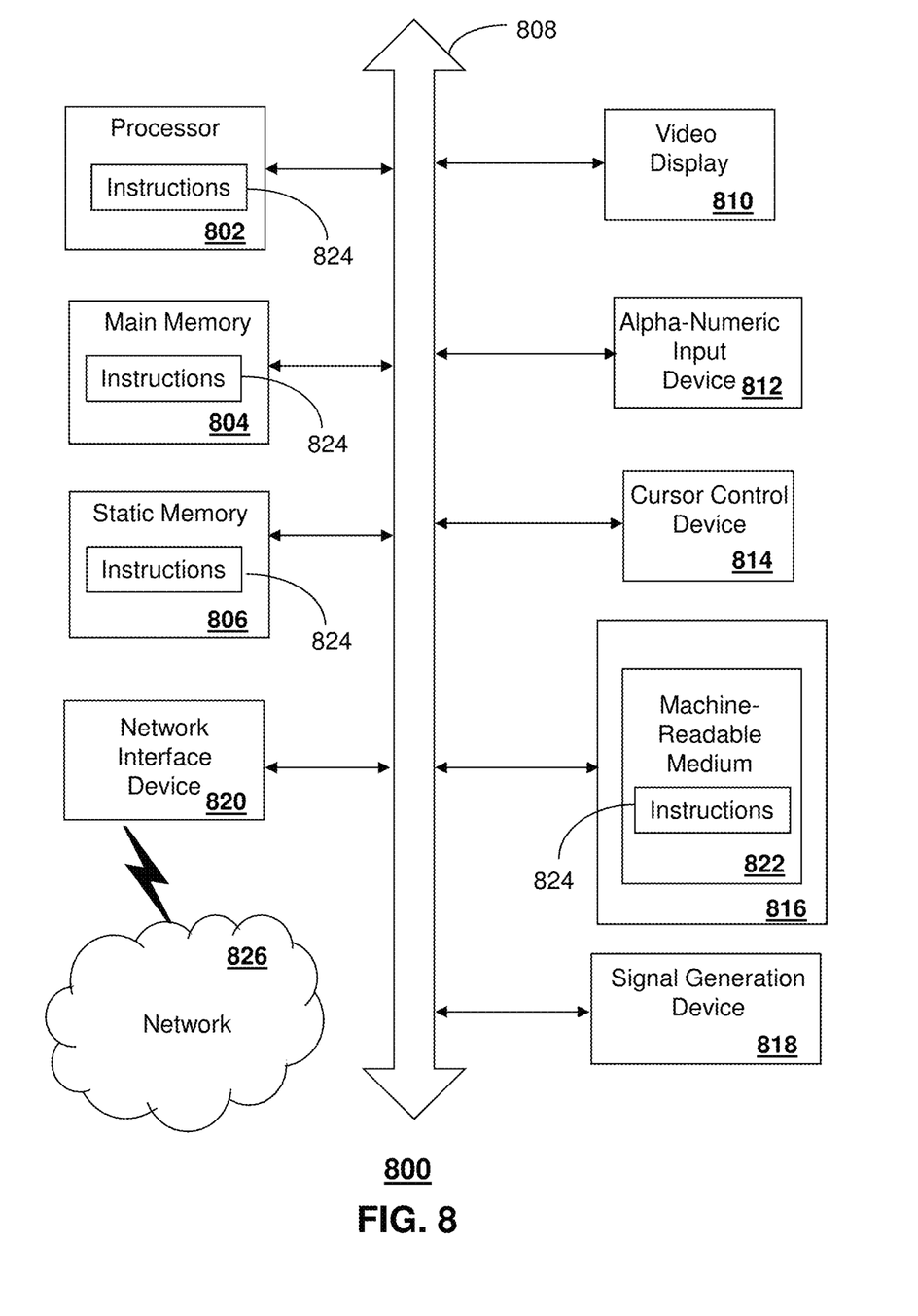
FIG. 8 is a diagrammatic representation of a machine in the form of a computer system within which a set of instructions, when executed, may cause the machine to perform any one or more of the methods described herein.

FIG. 8 depicts an exemplary diagrammatic representation of a machine in the form of a computer system 800 within which a set of instructions, when executed, may cause the machine to perform any one or more of the methods described above. One or more instances of the machine can operate, for example, as the APS 436, the media processor 406, local devices 112, 114, 116, 118, APS 136, components of content delivery network 120, APS 236, and other devices of FIGS. 1-7. In some embodiments, the machine may be connected (e.g., using a network 826) to other machines. In a networked deployment, the machine may operate in the capacity of a server or a client user machine in a server-client user network environment, or as a peer machine in a peer-to-peer (or distributed) network environment.

The machine may comprise a server computer, a client user computer, a personal computer (PC), a tablet, a smart phone, a laptop computer, a desktop computer, a control system, a network router, switch or bridge, or any machine capable of executing a set of instructions (sequential or otherwise) that specify actions to be taken by that machine. It will be understood that a communication device of the subject disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methods discussed herein.

The computer system 800 may include a processor (or controller) 802 (e.g., a central processing unit (CPU)), a graphics processing unit (GPU, or both), a main memory 804 and a static memory 806, which communicate with each other via a bus 808. The computer system 800 may further include a display unit 810 (e.g., a liquid crystal display (LCD), a flat panel, or a solid state display). The computer system 800 may include an input device 812 (e.g., a keyboard), a cursor control device 814 (e.g., a mouse), a disk drive unit 816, a signal generation device 818 (e.g., a speaker or remote control) and a network interface device 820. In distributed environments, the embodiments described in the subject disclosure can be adapted to utilize multiple display units 810 controlled by two or more computer systems 800. In this configuration, presentations described by the subject disclosure may in part be shown in a first of the display units 810, while the remaining portion is presented in a second of the display units 810.

The disk drive unit 816 may include a tangible computer-readable storage medium 822 on which is stored one or more sets of instructions (e.g., software 824) embodying any one or more of the methods or functions described herein, including those methods illustrated above. The instructions 824 may also reside, completely or at least partially, within the main memory 804, the static memory 806, and/or within the processor 802 during execution thereof by the computer system 800. The main memory 804 and the processor 802 also may constitute tangible computer-readable storage media.

Dedicated hardware implementations including, but not limited to, application specific integrated circuits, programmable logic arrays and other hardware devices can likewise be constructed to implement the methods described herein. Application specific integrated circuits and programmable logic array can use downloadable instructions for executing state machines and/or circuit configurations to implement embodiments of the subject disclosure. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the subject disclosure, the operations or methods described herein are intended for operation as software programs or instructions running on or executed by a computer processor or other computing device, and which may include other forms of instructions manifested as a state machine implemented with logic components in an application specific integrated circuit or field programmable gate array. Furthermore, software implementations (e.g., software programs, instructions, etc.) including, but not limited to, distributed processing or component/object distributed processing, parallel processing, or virtual machine processing can also be constructed to implement the methods described herein. Distributed processing environments can include multiple processors in a single machine, single processors in multiple machines, and/or multiple processors in multiple machines. It is further noted that a computing device such as a processor, a controller, a state machine or other suitable device for executing instructions to perform operations or methods may perform such operations directly or indirectly by way of one or more intermediate devices directed by the computing device.

While the tangible computer-readable storage medium 822 is shown in an example embodiment to be a single medium, the term "tangible computer-readable storage medium" should be taken to include a single medium or multiple media (e.g., a centralized or distributed database, and/or associated caches and servers) that store the one or more sets of instructions. The term "tangible computer-readable storage medium" shall also be taken to include any non-transitory medium that is capable of storing or encoding a set of instructions for execution by the machine and that cause the machine to perform any one or more of the methods of the subject disclosure. The term "non-transitory" as in a non-transitory computer-readable storage includes without limitation memories, drives, devices and anything tangible but not a signal per se.

The term "tangible computer-readable storage medium" shall accordingly be taken to include, but not be limited to: solid-state memories such as a memory card or other package that houses one or more read-only (non-volatile) memories, random access memories, or other re-writable (volatile) memories, a magneto-optical or optical medium such as a disk or tape, or other tangible media which can be used to store information. Accordingly, the disclosure is considered to include any one or more of a tangible computer-readable storage medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, and HTTP) represent examples of the state of the art. Such standards are from time-to-time superseded by faster or more efficient equivalents having essentially the same functions. Wireless standards for device detection (e.g., RFID), short-range communications (e.g., Bluetooth®, WiFi, ZigBee®), and long-range communications (e.g., WiMAX, GSM, CDMA, LTE) can be used by computer system 800. In one or more embodiments, information regarding use of services can be generated including services being accessed, media consumption history, user preferences, and so forth. This information can be obtained by various methods including user input, detecting types of communications (e.g., video content vs. audio content), analysis of content streams, and so forth. The generating, obtaining and/or monitoring of this information can be responsive to an authorization provided by the user. In one or more embodiments, an analysis of data can be subject to authorization from user(s) associated with the data, such as an opt-in, an opt-out, acknowledgement requirements, notifications, selective authorization based on types of data, and so forth.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. The exemplary embodiments can include combinations of features and/or steps from multiple embodiments. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all of the features described with respect to an embodiment can also be utilized.

Less than all of the steps or functions described with respect to the exemplary processes or methods can also be performed in one or more of the exemplary embodiments. Further, the use of numerical terms to describe a device, component, step or function, such as first, second, third, and so forth, is not intended to describe an order or function unless expressly stated so. The use of the terms first, second, third and so forth, is generally to distinguish between devices, components, steps or functions unless expressly stated otherwise. Additionally, one or more devices or components described with respect to the exemplary embodiments can facilitate one or more functions, where the facilitating (e.g., facilitating access or facilitating establishing a connection) can include less than every step needed to perform the function or can include all of the steps needed to perform the function.

In one or more embodiments, a processor (which can include a controller or circuit) has been described that performs various functions. It should be understood that the processor can be multiple processors, which can include distributed processors or parallel processors in a single machine or multiple machines. The processor can be used in supporting a virtual processing environment. The virtual processing environment may support one or more virtual machines representing computers, servers, or other computing devices. In such virtual machines, components such as microprocessors and storage devices may be virtualized or logically represented. The processor can include a state machine, application specific integrated circuit, and/or programmable gate array including a Field PGA. In one or more embodiments, when a processor executes instructions to perform "operations", this can include the processor performing the operations directly and/or facilitating, directing, or cooperating with another device or component to perform the operations.

The Abstract of the Disclosure is provided with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A non-transitory, machine-readable storage medium, comprising executable instructions that, when executed by a processing system including a processor, facilitate performance of operations, the operations comprising:

predicting an interest of a viewer in a media program that will be available for consumption over a content delivery network, wherein the predicting is based on viewer data;

determining a first advertisement to be shown to the viewer during a broadcast of the media program, the first advertisement being selected from a plurality of advertisements from available advertising campaigns associated with the content delivery network for the media program;

transmitting the first advertisement to a local device of the viewer in advance of the broadcast of the media program, wherein the transmitting occurs during a period of low utilization of the content delivery network, wherein the local device stores the first advertisement in a cache;

cuing a playout server at the local device to display the first advertisement at a selected portion of the broadcast of the media program, wherein, responsive to the cuing, the playout server, at the local device, retrieves the first advertisement from the cache, inserts the first advertisement into the selected portion of the broadcast of the media program, and displays the selected portion of the broadcast of the media program including the first advertisement;

determining that the playout server is not available at the local device;

responsive to determining that the playout server is not available, transmitting a second advertisement to the local device during the broadcast of the media program; and cuing the local device to display the second advertisement, wherein the local device displays the second advertisement when cued.

2. The non-transitory, machine-readable storage medium of claim 1, wherein the transmitting the first advertisement is performed by multicasting the first advertisement to a plurality of local devices, including the local device.

3. The non-transitory, machine-readable storage medium of claim 2, wherein the multicasting is performed over a network separate from the content delivery network, and wherein the processing system comprises a plurality of processor operating in a distributed processing environment.

4. The non-transitory, machine-readable storage medium of claim 1, wherein the processing system comprises a plurality of processors operating in a distributed processing environment.

5. The non-transitory, machine-readable storage medium of claim 1, wherein the first advertisement has nationwide or broad geographical scope.

6. The non-transitory, machine-readable storage medium of claim 1, wherein the operations further comprise selecting the second advertisement based on the viewer data.

7. The non-transitory, machine-readable storage medium of claim 1, wherein the operations further comprise:
  determining that a first time slot in the media program allocated to the first advertisement has been released wherein the second advertisement is displayed in the first time slot.

8. The non-transitory, machine-readable storage medium of claim 1, wherein the predicting correlates the viewer data with media programs having high anticipated viewership.

9. The non-transitory, machine-readable storage medium of claim 1, wherein the first advertisement and the second advertisement are received over a network different from the content delivery network.

10. A method, comprising:
  determining, by a processing system including a processor, a predicted level of interest of a viewer in a media program that will be available for consumption over a content delivery network, wherein the predicted level of interest is based on viewer data, wherein the determining is performed according to available advertising campaigns associated with the content delivery network related to the media program;
  identifying, by the processing system, a first advertisement selected from a plurality of advertisements from the available advertising campaigns associated with the content delivery network for the media program to be shown to the viewer during a broadcast of the media program according to the determining the predicted level of interest of the viewer;
  transmitting, by the processing system, the first advertisement to a local device of the viewer, wherein the transmitting occurs during a period of low utilization of the content delivery network, wherein the local device stores the first advertisement in a cache;
  cuing, by the processing system, a playout server at the local device to display the first advertisement at a selected portion of the broadcast of the media program, wherein, responsive to the cuing, the playout server, at the local device, retrieves the first advertisement from the cache, inserts the first advertisement into the selected portion of the broadcast of the media program, and displays the selected portion of the broadcast of the media program including the first advertisement;
  determining, by the processing system, that the playout server is not available at the local device;
  responsive to determining that the playout server is not available, transmitting, by the processing system, a second advertisement to the local device during the broadcast of the media program; and
  cuing, by the processing system, the local device to display the second advertisement, wherein the local device displays the second advertisement when cued.

11. The method of claim 10, further comprising identifying, by the processing system, available bandwidth in the content delivery network; and transmitting, by the processing system, the first advertisement during the available bandwidth.

12. The method of claim 10, further comprising multicasting, by the processing system, the first advertisement to a plurality of local devices via a network different from the content delivery network.

13. The method of claim 10, further comprising:
  determining, by the processing system, that a first time slot in the media program allocated to the first advertisement has been released, wherein the local device displays the second advertisement in the first time slot instead of cuing the local device to display the first advertisement.

14. The method of claim 10, further comprising correlating, by the processing system, the viewer data with media programs having high anticipated viewership to determine the predicted level of interest.

15. The method of claim 10, wherein the first advertisement and the second advertisement are received over a network different from the content delivery network.

16. A local device, comprising:
  a playout server;
  a processing system including a processor; and
  a memory that stores executable instructions that, when executed by the processing system, facilitate performance of operations, the operations comprising:
    providing viewer data to a content delivery network, wherein the viewer data is used to predict selection of a media program that will be available from a broadcast over the content delivery network;
    receiving a first advertisement in advance of the broadcast of the media program from among a plurality of advertisements from available advertising campaign associated with the content delivery network, wherein the first advertisement is determined according to the selection of the media program and according to a requirement of the available advertising campaign;
    storing the first advertisement in a cache of the local device;
    receiving a first cue to display the first advertisement at a selected portion of the broadcast of the media program, wherein, responsive to the receiving the first cue, the playout server retrieves the first advertisement from the cache of the local device, inserts the first advertisement into the selected portion of the broadcast of the media program, and displays the selected portion of the broadcast of the media program including the first advertisement;
    responsive to determining that the playout server is not available:
      receiving a second advertisement during the broadcast of the media program;
      receiving a second cue to display the second advertisement; and
      displaying the second advertisement in response to receiving the second cue to display the second advertisement.

17. The local device of claim 16, wherein the second advertisement is displayed in a first time slot allocated for display of the first advertisement.

18. The local device of claim 16, wherein the first advertisement and the second advertisement are received over a network different from the content delivery network, and wherein the processing system comprises a plurality of processor operating in a distributed processing environment.

* * * * *